(12) United States Patent
Rinner et al.

(10) Patent No.: US 7,175,184 B1
(45) Date of Patent: Feb. 13, 2007

(54) COLLECT TOOL HOLDER AND METHOD OF MAKING SAME

(75) Inventors: James A. Rinner, Racine, WI (US); Hva Gao, Fox Point, WI (US)

(73) Assignee: Pilling Weck Incorporated, Horsham, PA (US)

( * ) Notice: Subject to any disclaimer, the term of this patent is extended or adjusted under 35 U.S.C. 154(b) by 455 days.

(21) Appl. No.: 10/692,076

(22) Filed: Oct. 24, 2003

(51) Int. Cl.
*B23B 31/107* (2006.01)

(52) U.S. Cl. .............................. 279/43; 279/50; 279/75

(58) Field of Classification Search ................. 279/22, 279/30, 43, 50, 57, 74, 75, 82, 137; 29/428, 29/505, 453, 506, 512
See application file for complete search history.

(56) References Cited

U.S. PATENT DOCUMENTS

| | | | |
|---|---|---|---|
| 1,174,997 A | 3/1916 | Lackner | |
| 1,636,421 A | 7/1927 | Knott | |
| 1,740,645 A | 12/1929 | Currier | |
| 2,172,070 A | 9/1939 | Palmgren | 279/65 |
| 2,370,487 A | 2/1945 | Poutie | 279/42 |
| 2,472,392 A | 6/1949 | Alexander | 279/75 |
| 2,731,273 A * | 1/1956 | Edens | 279/81 |
| 2,835,497 A | 5/1958 | Suhner | 279/42 |
| 2,926,020 A | 2/1960 | Dayton | 279/75 |
| 2,931,660 A | 4/1960 | Barwinkel | 279/48 |
| 3,240,520 A | 3/1966 | Dailey | |
| 3,583,715 A | 6/1971 | Jahri | 279/75 |
| 3,633,931 A | 1/1972 | Bitz | 279/75 |
| 3,674,281 A * | 7/1972 | Hedsrick | 279/30 |
| 3,708,178 A | 1/1973 | Lauricella | 279/81 |
| 3,724,563 A | 4/1973 | Wickham | 173/163 |
| 3,747,946 A * | 7/1973 | Edens | 279/81 |
| 3,790,182 A * | 2/1974 | Schuman | 279/43 |
| 3,947,047 A | 3/1976 | Hultman | 279/1 B |
| 4,014,558 A * | 3/1977 | Brinkman | 279/50 |
| 4,032,163 A | 6/1977 | Holt | 279/37 |
| 4,199,160 A | 4/1980 | Bent | 279/30 |
| 4,347,753 A * | 9/1982 | Claussen et al. | 74/110 |
| 4,441,563 A | 4/1984 | Walton | 173/163 |
| 4,463,960 A | 8/1984 | Walton | 279/60 |
| 4,525,111 A | 6/1985 | Gutsche | 408/239 A |
| 4,614,469 A | 9/1986 | Beere | 409/219 |
| 4,692,073 A | 9/1987 | Martindell | 408/239 A |
| 4,877,020 A | 10/1989 | Vich | 128/92 V |
| 4,900,202 A | 2/1990 | Wienhold | 408/240 |
| 4,991,859 A | 2/1991 | Rohm | 279/60 |
| 5,013,194 A | 5/1991 | Wienhold | 408/240 |

(Continued)

FOREIGN PATENT DOCUMENTS

JP 01011701 A * 1/1989

*Primary Examiner*—Monica Carter
*Assistant Examiner*—J Williams
(74) *Attorney, Agent, or Firm*—Baker & Hostetler LLP

(57) ABSTRACT

A tool holder for a tool with a recess having detent disposed therein for holding the tool axially, and having a sleeve telescoped over a collet which has flexible fingers and with the sleeve and the fingers having camming surfaces for effecting clamping onto the tool. The axial locations of the recess and the detent and the camming surfaces are such that they are all in an engaged position when the sleeve is in one position along the axis. The sleeve and the collet have chamfers interengagable upon telescopic movement between the sleeve and the collet for flexing the fingers to thereby have the collet slide into the sleeve.

7 Claims, 2 Drawing Sheets

U.S. PATENT DOCUMENTS

| | | | |
|---|---|---|---|
| 5,037,254 A | 8/1991 | Asberg | 409/233 |
| 5,062,749 A | 11/1991 | Sheets | 408/240 |
| 5,167,476 A | 12/1992 | Lafferty | 408/240 |
| 5,195,760 A | 3/1993 | Wheeler | 279/60 |
| 5,301,961 A | 4/1994 | Wozar | 279/46.2 |
| 5,653,453 A * | 8/1997 | Nakamoto | 279/50 |
| 5,678,961 A | 10/1997 | Fleege | 408/239 A |
| 5,755,448 A | 5/1998 | Kanaan | 279/75 |
| 5,820,136 A | 10/1998 | Han | 279/131 |
| 5,833,405 A | 11/1998 | Nielsen | 408/226 |
| 5,938,212 A | 8/1999 | Wadsworth | 279/42 |
| 5,988,957 A | 11/1999 | Wheeler | 408/239 R |
| 6,179,302 B1 | 1/2001 | Gauthier | 279/75 |
| 6,199,872 B1 | 3/2001 | Hasan | 279/30 |
| 6,325,393 B1 | 12/2001 | Chen | 279/22 |
| 6,457,916 B2 | 10/2002 | Wienhold | 408/240 |
| 6,517,297 B2 | 2/2003 | Cochran | 408/226 |

* cited by examiner

COLLECT TOOL HOLDER AND METHOD OF MAKING SAME

This invention relates to a collet tool holder and a method of making same, and, more particularly, it relates to a tool holder having a collet and which securely holds and stabilizes a tool for applying a rotary drive thereto, and it includes the method of making the holder.

BACKGROUND OF THE INVENTION

Tool holders are already known in the prior art, and they individually have a collet and a ball and a slidable collar, all for quickly securing and releasing a rotary tool in the holder. Those prior art holders include a central and elongated driving body which has the sliding collar telescoped thereover and wherein the sliding collar engages a ball which moves radially in response to the collar sliding movement and the ball is thus pressed inward onto the tool for holding the tool. A spring is commonly used in that type of holder, and the spring axially urges on the collar.

The present invention improves upon that art by providing a holder that has a detent ball and a collet and an axially slidable sleeve for activating the ball and the collet. The ball and a recess on the tool itself and the collet tool-engaging surfaces are all inter-related along the holder longitudinal axis such that the spring urges the sleeve to its securing position and the ball and the collet surfaces are all then in their engaged positions.

That is, the ball and the collet are simultaneously engaged when the spring has urged the sleeve to its operative axial position. At that time, the tool is being held axially and rotationally and stably all being achieved in response to the urging of the spring, that is, quickly and automatically.

The invention also includes the method of making the aforementioned assembly.

DETAILED DESCRIPTION OF THE PREFERRED EMBODIMENT AND METHOD

The following description predominantly refers to the actual structure of the preferred holder, however, it will be readily seen and understood that the method of making the structure is also disclosed by that description and as presented herein.

The drawings show there is a cylindrical and elongated body 10 and a collet 11 is suitably connected to the body 10, such as by welding, for instance, and the body 10 and the collet 11 extend co-axially along the holder longitudinal axis A. A cylindrical sleeve 12 is telescopically and co-axially disposed on the collet 11 and it is slidable on the collet cylindrical surface designated 13. Thus, the collet 11 and the sleeve 12 have cylindrical mating surfaces at 14, and they are snug and therebetween. Thus the sleeve 12 is slidably piloted on the collet 11.

Figure 2:
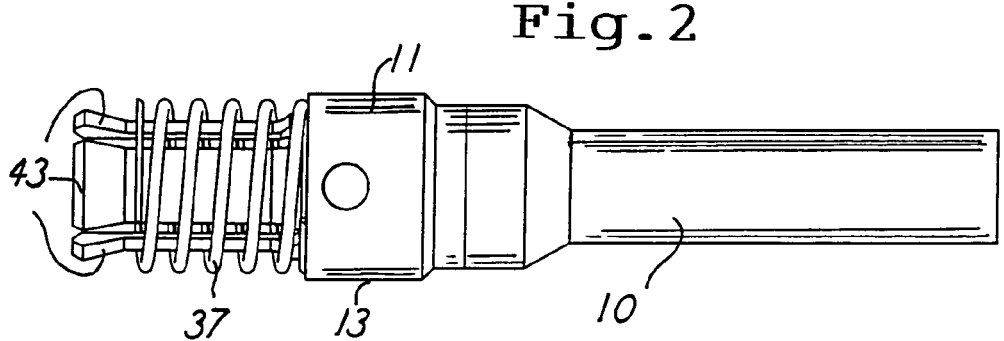
FIG. 2 is a side elevational view like FIG. 1, but with the sleeve removed.
Figure 1:
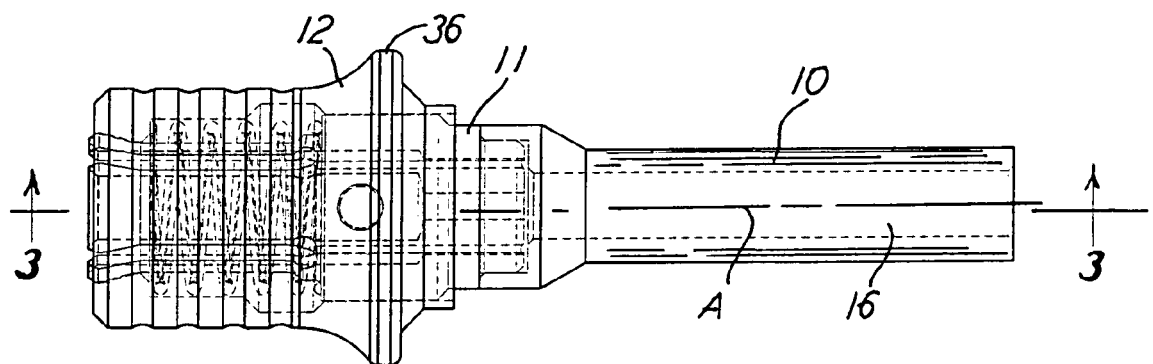
FIG. 1 is a side elevational view of a holder of this invention.
Figure 3:
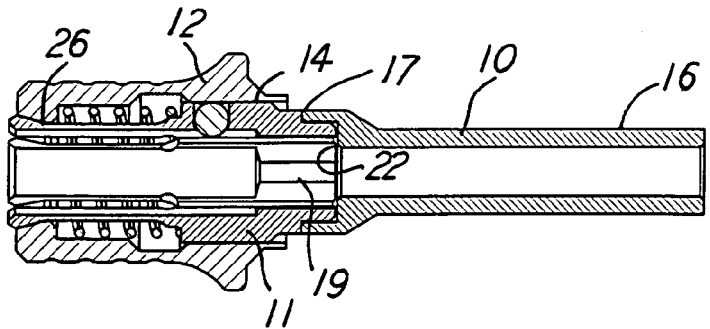
FIG. 3 is a sectional view taken on a plane designated by the line 3—3 of FIG. 1 but on a reduced scale.
Figure 4:
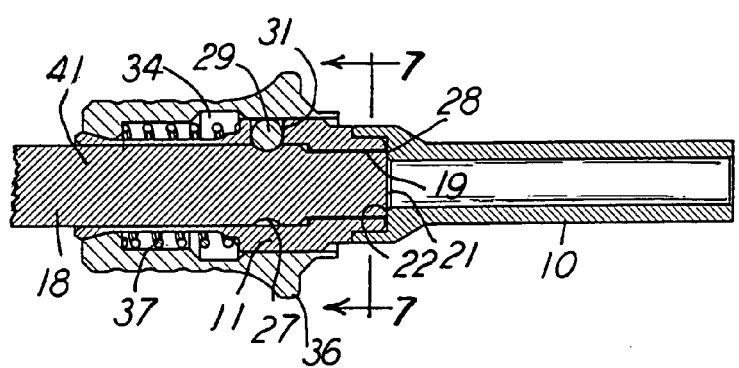
FIG. 4 is a sectional view like FIG. 3 but showing a fragment of a tool.
Figure 7:
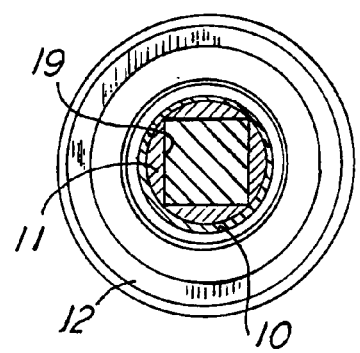
FIG. 7 is a sectional view taken on a plane designated by the line 7—7 of FIG. 4.
Figure 5:
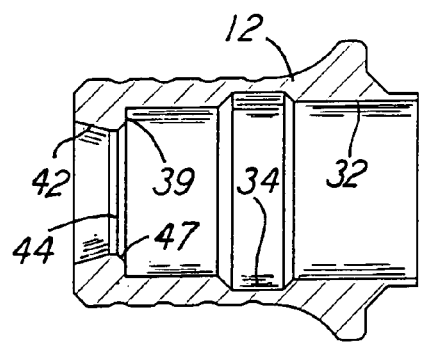
FIG. 5 is an enlarged sectional view of the sleeve shown in FIG. 3.
Figure 6:
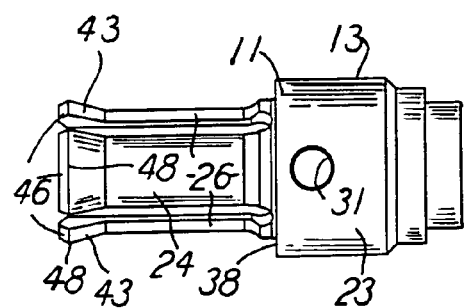
FIG. 6 is a top plan full view of the collet shown in FIG. 2.

The right end 16 of the body 10, as viewed herein, may be attached to a conventional but unshown driving tool. The body 10 and the collet 11, being connected together at 17, rotate together about the axis A and under the rotation drive of the unshown driving tool. Also, as shown in FIG. 4, a work tool 18 is disposed in a substantially square opening 19 in the collet 11, such as the openings shown in either FIG. 3 or 7, and the end 21 of the tool 18 axially abuts a shoulder 22 on the body 10. Thus, the axial position of the tool 18 along the axis A is established and set when the tool 18 is fully inserted into the collet 11, as shown in FIG. 4. It will be understood that various tools 18, including drills, can be substituted and inserted into the holder described herein.

The collet 11 extends along the axis A and has a cylindrical portion 23 and a split-finger portion 24 which includes three fingers 26 extending axially and in a composite cylindrical pattern about the axis A. The portion 23 is rigid and the fingers 26 are flexible radially of the axis A and they surround the tool 18. The tool 18 has a circular groove 27 therearound and axially spaced a distance from the tool end 21. That distance is the same as the distance between the end 28 of the collet 11 and a ball 29 which is in a pocket 31 in the collet portion 23.

The sleeve 12 has an internal cylindrical wall 32 which slides axially on the collet cylindrical wall 13, and the sleeve 12 has a cylindrical recess 34 which, when the sleeve 12 is slid to the right as viewed in FIG. 4, the recess 34 receives the ball 29 to thereby have the ball move out of the retaining pocket 31 and thereby release the axial restraint on the tool 18 for removal of the tool. The sleeve 12 has a circular raised portion 36 for the operator to grasp with fingers and slide the sleeve to the right, as mentioned.

A compression spring 37 extends between the collet 11 and the sleeve 12 to urge the sleeve 12 to the left, as viewed in FIG. 4, and thus urge to the ball-retention position seen in the drawings. To confine the spring 37, the collet 11 has a circular shoulder 38 and the sleeve 12 has a circular shoulder 39, and the spring 37 extends and is confined between those two shoulders. The sleeve 12 is thus normally spring-urged leftward, as seen in FIGS. 3 and 4.

The tool 18 has a cylindrical shank 41 extending adjacent the collet fingers 26 which conform to that cylindrical shape and encircle the shank 41. To apply a clamping action onto the tool shank 41, the sleeve 12 forces radially inwardly on the fingers 26 to press them against the tool shank 41 and thereby stabilize and grip the tool 18. To move the fingers 26 radially inwardly, the sleeve 12 has a tapered camming circular surface 42 facing radially inwardly, and each sleeve finger 26 has a tapered camming surface 43 extending obliquely relative to the axis and on the distal end of each finger 26 and facing radially outwardly. The tapered surfaces slide on each other in the movement of the sleeve 12 to the left. By that action, the fingers 26 are forced radially inwardly and clamp onto the tool 18 and thereby radially stabilize the tool.

In that relationship, the shoulders 21 and 28 and the groove 27 and the locking surface 32 and the tapered surfaces 42 and 43 are all respective positioned relative to the longitudinal extent of the axis A and with respect to each other to achieve the simultaneous abutment at shoulder 28 and the ball detent lock in the groove 27 and the radially forcing between the tapered surfaces 42 and 43. Thus the tool 18 is securely held by the holder in both the axial and rotational manners.

In achieving the assembly of the holder, the spring 37 and the ball 29 would be initially placed in their respective positions before the telescopic assembling which causes the fingers to flex radially inwardly to clear the circular configuration at 44 on the sleeve 12. The collet 11 and the sleeve 12 have cooperating surfaces respectively at 46 and 47. Surface 47 is frusto-conical, and surfaces 46 are angulations on the ends of each finger 26. Thus, the collet 11 and the sleeve 12 can be axially and into their telescoped assembled positions by having the sleeve tapered or chamfered surface 47 abut an slide onto the finger chamfered surfaces 46 to compress the fingers radially inwardly.

Thus the sleeve has its circular configuration 44 and chamfer 47 with a diameter which is less than the outside diameter of the free-body extent of the extended edges 48 of the finger chamfers 46. The arrangement is such that the chamfers 46 are arcuate, and in three locations as shown herein, and they are disposed to be angled obliquely to the axis A and they face radially outwardly. Complimentary, the sleeve conical surface 47 has the angulation as that of the chamfers 46 of the fingers 26, and the chamfer 47 faces radially inwardly. It will be noticed that the fingers 26 at their angled ends 43 are flared radially outwardly and are slightly larger in thickness toward the extreme terminal ends of each finger, as seen in FIG. 4. Thus the fingers 26 present a substantially complete snug circular entrapment of the tool shank 41 throughout the lengths of the fingers 26 while also being in full surface contact with the frusto-conical camming surface 42 on the outer circumference of the finger end at 43. The chamfers 46 and 47 are shown angled at forty-five degrees, and they match each other to be substantially parallel surfaces, though other angulations could be employed.

While the above is specific, it will be understood that equivalent modifications could be incorporated into the entire assembly. Also, the method of assembling is described herein, including in the description of the construction.

What is claimed is:

1. A holder for holding a tool on a longitudinal axis and with said tool having a shank with a recess, comprising:
    a split collet disposed circumferentially about and being rotatable about said axis and having a body portion and fingers extending from said body portion and parallel to said axis and being radially movable relative to said axis and having an end distal from said body portion,
    said body portion having a socket for reception of said tool shank and for transmitting rotational drive to said tool and about said axis,
    a sleeve co-extensively surrounding said collet and being slidable on said collet along said axis and extending circumferentially over said tool shank recess and said fingers,
    said fingers and said sleeve having mutually engagable camming surfaces for urging said fingers radially toward said axis upon sliding said sleeve in the direction of said distal end and thereby have said fingers radially clamp said tool,
    a spring for urging said sleeve toward said distal end,
    a detent ball on said sleeve adjacent said body portion and located to be disposed in said tool shank recess when said sleeve has urged said fingers radially inwardly,
    a ball-engaging surface on said sleeve to be in contact with said ball in a first axial position of said sleeve to position said ball into said tool shank recess and thereby hold said tool against movement along said axis and said sleeve having a relief located to receive said ball in a second axial position of said sleeve and thereby release said ball from said tool shank recess, and
    wherein an axially spaced-apart relative position of said camming surfaces when in contact with each other and that of said ball engaging surface is such that said camming surfaces are rotationally clamping said tool when said ball engaging surface has positioned said ball in said recess.

2. A holder for holding a tool on a longitudinal axis and with said tool having a shank with a recess, comprising:
    a split collet disposed circumferentially about and being rotatable about said axis and having a body portion and fingers extending parallel to said axis and being radially movable relative to said axis and having an end distal from said body portion,
    said body portion having a socket for reception of said tool shank and for transmitting rotational drive to said tool and about said axis,
    a sleeve co-extensively surrounding said collet and being slidable on said collet along said axis and extending circumferentially over said tool shank recess and said fingers,
    a spring for sliding said sleeve toward said distal end,
    said fingers and said sleeve having mutually engagable camming surfaces for urging said fingers radially toward said axis upon sliding said sleeve in the direction of said distal end and thereby have said fingers radially clamp said tool,
    a detent ball on said sleeve adjacent said body portion and located to be disposed in said tool shank recess when said sleeve has urged said fingers radially inwardly,
    a ball-engaging surface on said sleeve to be in contact with said ball in one axial position of said sleeve to position said ball into said tool shank recess and thereby hold said tool against movement along said axis and said sleeve having a relief located to receive said ball in a second axial position of said sleeve and thereby release said ball from said tool shank recess, and
    the relative locations along said axis of said camming surfaces and said ball engaging surface and said detent ball are such that axial movement of said sleeve toward said distal end results in said camming surfaces clamping said tool, for stabilizing said tool, when said detent ball is positioned by said ball engaging surface in said shank recess for axial restraint of said tool.

3. The holder for holding a tool as claimed in claim 2, including:
    said holder has a stop engagable with said tool for setting the axial positioning of said tool along said axis.

4. A holder for holding a tool on a longitudinal axis and with said tool having a shank with a recess therein, comprising:
    a split collet disposed circumferentially about and being rotatable about said axis and having a body portion and fingers extending parallel to said axis and being radially movable relative to said axis and having an end distal from said body portion,
    said body portion having a socket for reception of said tool shank,
    a sleeve co-extensively surrounding said collet and being slidable on said collet along said axis and extending circumferentially over said tool shank recess and said fingers, a spring for urging sliding of said sleeve toward said distal end, said fingers and said sleeve having mutually engagable camming surfaces for urging said fingers radially toward said axis upon sliding said sleeve in the direction of said distal end and thereby have said fingers radially clamp said tool, a detent ball on said sleeve adjacent said body portion and located to be disposed in said tool shank recess when said sleeve has urged said fingers radially inwardly, a ball engaging surface on said sleeve to be in contact with said ball in a first axial position of said sleeve to position said ball into said tool shank recess and thereby hold said tool against movement along said axis and said sleeve having a relief located to receive said ball in a second axial position of said sleeve and thereby release said ball from said tool shank recess, the relative axial locations of said camming surfaces and said ball engaging surface and said detent ball are such that axial movement of said sleeve toward said distal end results in said camming surfaces clamping said tool and said ball engaging said shank recess, all for stabilizing said tool, and said sleeve being telescopically slidable over said collet distal end of said fingers and said sleeve and said collet distal ends having slidably engagable surfaces for moving said finger distal ends radially inwardly upon sliding said sleeve over said collet to effect said clamping.

5. The holder for holding a tool as claimed in claim 4, wherein:

said slidable engagable surfaces are chamfers on both said sleeve and said fingers and which match each other.

6. The holder for holding a tool as claimed in claim 5, wherein:

said chamfer on said sleeve is faced radially inwardly and said chamfer on said fingers is faced radially outwardly.

7. A method of making a tool holder with a longitudinal axis, for a rotatable tool which has a circular shank and an end wall and a recess spaced a distance from said end wall, including the steps of:

providing a collet centered on said axis and having clamping surfaces movable radially to said axis, providing a sleeve for sliding along said axis and having a circular opening for axial movement of said sleeve over said collet, providing mutually engagable camming surfaces on said collet and said sleeve for engagement upon axial movement of said sleeve on said collet and for positioning said clamping surfaces onto said tool, interposing a detent between said shank and said sleeve and having a surface on said sleeve for engaging said detent for axially holding said tool, interposing a spring between said collet and said sleeve for urging said collet and said sleeve in an axial direction along said axis, forming chamfers on said collet and said sleeve for mutual engagement for effecting sliding telescoping assembly of said sleeve over said collet in response to said chamfers causing said clamping surfaces to flex radially inwardly, and the respective locations along said axis of said tool recess and said detent and said sleeve surface and said clamping surfaces and said chamfers being such that upon the urging of said sleeve in said axial direction said tool is held by said holder.

* * * * *

UNITED STATES PATENT AND TRADEMARK OFFICE
CERTIFICATE OF CORRECTION

PATENT NO.       : 7,175,184 B1                                   Page 1 of 1
APPLICATION NO.  : 10/692076
DATED            : February 13, 2007
INVENTOR(S)      : James A. Rinner et al.

It is certified that error appears in the above-identified patent and that said Letters Patent is hereby corrected as shown below:

On the title page:
Item (75)
Please replace "Hva Gao" with --Hua Gao--.

Signed and Sealed this

Twenty-fourth Day of April, 2007

JON W. DUDAS
*Director of the United States Patent and Trademark Office*